(12) United States Patent
Kusakabe

(10) Patent No.: US 6,431,716 B1
(45) Date of Patent: Aug. 13, 2002

(54) SPREAD ILLUMINATING APPARATUS

(75) Inventor: Kiyoshi Kusakabe, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/487,804

(22) Filed: Jan. 20, 2000

(30) Foreign Application Priority Data

Jul. 26, 1999 (JP) .......................................... 11-210559

(51) Int. Cl.⁷ .............................................. F21V 13/04
(52) U.S. Cl. ........................ 362/31; 362/560; 362/558; 385/50
(58) Field of Search .............................. 362/26, 27, 31, 362/560, 561, 558, 556; 385/47, 50

(56) References Cited

U.S. PATENT DOCUMENTS

| | | | | |
|---|---|---|---|---|
| 5,664,862 A | * | 9/1997 | Redmond | 362/31 |
| 5,857,761 A | * | 1/1999 | Abe | 362/551 |
| 5,868,486 A | * | 2/1999 | Takano | 362/31 |

FOREIGN PATENT DOCUMENTS

| | | |
|---|---|---|
| JP | A-5-134251 | 5/1993 |
| JP | A-9-33923 | 2/1997 |
| JP | 10-095344 | 3/1998 |

* cited by examiner

Primary Examiner—Sandra O'Shea
Assistant Examiner—Hargobind S. Sawhney
(74) Attorney, Agent, or Firm—Oliff & Berridge, PLC

(57) ABSTRACT

In the side light system of the spread illuminating apparatus in which a bar-like light source is disposed close to one side of the transparent substrate made of a transparent material, on the other end 17 of the light conductive member 13 where the spot-like light source 12 is not disposed, the light reflection means 26 is provided. From one end 14 of the light conductive member 13 the light $L_1$ emitted from the spot-like light source 12 enters the light conductive member. The emitted light $L_1$ is reflected by the groove 20 of the optical path conversion means 15 and discharged from the surface 18 of the light conductive member 13 opposing to the transparent substrate. Further one part $L_2$ of the emitted light from the spot-like light source 12 is reflected by the light reflection means 26 and progresses again in the light conductive member 13 toward the spot-like light source 12. And, the reflected light $L_2$ also is reflected by the groove 20 of the light reflection pattern 7 is discharged from the surface 18 of the light conductive member 13 opposing to the transparent substrate. Accordingly, the light volume emitted toward the transparent substrate can be increased.

2 Claims, 9 Drawing Sheets

SPREAD ILLUMINATING APPARATUS

BACKGROUND OF THE INVENTION

1. Field of the Invention

This invention relates to a spread illuminating apparatus for illuminating a front portion of a display and various kinds of reflection type of displays and so on, in particular for an illuminating means for a liquid crystal display.

2. Conventional Art

A liquid crystal display which functions at a low energy consumption has features such as thin in size and light in weight, so that the demand as an indication apparatus primarily for computer has been increased. However, since the liquid crystal itself does not emit a light, for viewing an image, it needs an illuminating means for observing images, different from a light-emitting element, such as a picture tube.

In particular, in the midst of recent tendency for requiring a thinner type of appliance, as an illuminating means for a liquid crystal display, a spread illuminating apparatus of a thin plate-like type of side light system (light conductive plate system) has been utilized.

Hereinafter, a constitution of a side light system of the spread illuminating apparatus 41 is explained based on FIG. 13.

Reference numeral 42 shows a bar-like light source lamp such as cold cathode fluorescent lamp (CCFL) or hot cathode fluorescent lamp (HCFL) to be used as a light source for a spread illuminating apparatus. A transparent substrate 43 made of a material having a high transparency is configured of a thin rectangular in section, and along with one side end 44, a light source lamps 42 is disposed at a given spacing. Now, the transparent substrate 43 may be formed wedge-like, wherein, in order to reduce the weight, in such a manner as the transparent substrate 43 is made the thinner, the farther from the side end 44 at which the light source lamp 42 is located.

Around the light source lamp 42 and at the position where the side end 44 does not face, a lamp reflector 45 formed by vaporizing the silver etc. on a film is disposed. By providing thus the lamp reflector 45, most light emitted from the light source lamp 42 is enabled to make an incidence into the transparent substrate 43 from the side end 44. Further, in order to prevent the light from being leaked, to the side ends other than the side end 44 of the transparent substrate 43 (in FIG. 13, merely one side end 46 which opposes to the one side end 44 is indicated) reflection members 47 made of reflection tapes and so on are applied.

On a rear surface 48 (low in FIG. 13) of the transparent substrate 43, without depending on the distance from the light source lamp 42, in order to make the screen of the spread illuminating apparatus emitted evenly, a light diffusion pattern 49 (later being explained in details) is formed, and further downward a reflection plate 50 is disposed in such a manner it covers all of the rear surface 48. The reflection plate 50 makes the light which tries to emit from the rear surface 48 of the transparent substrate 43 reflected and directed toward the front surface 51 (upper in FIG. 13) of the transparent substrate 43.

Further, a spread illuminating apparatus 41 is provided with a diffusion plate 52 in such a manner as it covers whole of the front surface 51 of the transparent substrate 43. The reason why this diffusion plate 51 is disposed is explained. That is, since most light which progresses in the transparent substrate 43 and emits from the surface 51 are observed in such a manner as merely the light diffusion pattern 49 brightens (so called a dot-image), in order to remove such dot-image the light diffusion plate 52 makes the light progressing therein overlapped (that is, diffused) and emitted the light approximately evenly on the transparent substrate 43 by making the density and distribution of the emitting light even. The light diffusion pattern 49 shown in FIG. 14, as disclosed in the patent laid-open publication No. Hei 5-134251, is formed in such a manner as the diameters of the dots disposed thereon become gradually large in proportion to approaching the side end 46 opposing to the side end 44, along which the light source lamp 42 is disposed. The light diffusion pattern 49 is formed by coating a medium containing light diffusing and reflecting materials directly on the rear surface 48 of the transparent substrate 43 by a screen printing process.

Thus, the light diffusion pattern 49 is formed by changing the ratio in which, depending on its position per unit area, the medium containing the light diffusing and reflecting materials are defined, (hereinafter referred the ratio by which a given material may occupy per unit to as "area density"), so that the light volume to be emitted from the surface 51 is changed by being reflected by the light diffusion pattern 49. That is, since the brightness of the light becomes the higher the closer to the light source lamp 42, in order to realize an even spread emitting, the area density of the light diffusion pattern 49 is formed in such a manner as it becomes the large the far from the light source lamp 42. Thereby, since the light volume to be reflected on the surface 51 separated as far from the light source lamp 42, the balance between the distance from the light source lamp 42 and the light volume to be reflected by the light diffusion pattern 49 is to be considered to make the whole body emitted even. Here, although the light diffusion pattern 49 are, in FIG. 14, not sectional, hatching is applied for an easy looking.

Although the light diffusion pattern 49 is adapted to be formed by coating the medium containing the light diffusion and reflecting materials on the rear surface 48 of the transparent substrate 43, it is not limited to such a construction but may be constructed by what is to increase the light reflection, for instance, as disclosed in Japanese Patent Laid-open Publication No. Hei 9-33923, a finely formed concavo-convex surface may be directly formed on the rear surface 48 of the transparent substrate 43 and is adapted to make the light diffused and reflected.

Further, as an illuminating means for a liquid crystal display apparatus, in particular, for what is used as an auxiliary means for a reflection type of a liquid crystal display apparatus, a different type of illuminating apparatus other than the above spread illuminating apparatus 41 is explained as follows. The reflection type of a liquid crystal display is a type which can illuminate the screen making use of environmental light as an illuminating light and there is no need of an internal illuminating means, but when the surrounding is dark, since it becomes difficult to observe the screen, an auxiliary illuminating means will be necessary. As a preferable example, of such auxiliary illuminating means for a liquid crystal display, in the patent application No. Hei 9-347648, a spread illuminating apparatus for being disposed in front of (on both of) a reflection type of a liquid crystal display is disclosed.

What is shown in this type of an illuminating apparatus 1' in FIG. 15, is what is used while covering an observation surface F of a liquid crystal display element L of the above constitution and its constitution resides, as shown in FIGS. 15 and 16, in that a bar-like light source lamp 4 is disposed close to one side end 3 of a plate-like transparent substrate 2 having a high transparency and formed rectangular in section. The light source lamp 4 is formed with a cold cathode fluorescent lamp (CCFL) or a hot cathode fluorescent lamp (HCFL). In addition, as the transparent substrate 2, so as to reduce the weight, what becomes gradually thinner in thickness as it separates far from the one side end 3 wedgewise, is used.

Here, one side of the transparent substrate 2 (lower in FIG. 16) which abuts to a reflection type of the liquid crystal element L in FIG. 15 is to be called as a lower surface 5 and another side(upper in FIG. 16) which is an observation surface (picture surface) opposite to one side is to be called as an upper surface 6 (front surface).

On the upper surface 6 of the transparent substrate 2, a light reflection pattern 7 is constituted with a plurality of groove portions 8 of the transparent substrate 2 approximately triangular in section and plane portions 9 adjacent to the groove portions 8. The light reflection pattern 7 is formed in spacing thereof differently in such a manner as the brightness of the transparent substrate 2 becomes even at which position from the light source lamp 4 the groove 8 is located. That is, the ratio of the width (occupation area)of the groove 8 to the width (occupation area) of the plane portion 9 is settled so as to become gradually larger in proportion to the distance of the groove 8 separating from one side end 3 of the transparent substrate 2. For reference, since the groove 8 of the light reflection pattern 7 is quite minute, those may not be recognized by observing the picture surface by naked eyes.

When such a spread illuminating apparatus 1' as an auxiliary illumination is added to a reflection type of the liquid crystal display element L, the light emitted from the light source lamp 4 enters the transparent substrate 2 from the one side end 3 thereof and while repeating reflection and refraction during progressing inside thereof and toward the opposite surface 10, the light emits little by little from the lower surface 5 which illuminates the reflection type of the liquid crystal element L disposed close to the transparent substrate 2.

Further, since the transparent substrate 2 is provided with the light reflection pattern 7, the light emitted from the lower surface 5 can be made to be distributed even.

For reference, although an illustration in FIGS. 15 and 16 is omitted, since the portions around the light source lamp 4 and the one side end 3 are covered with a film-like reflecting member, a coupling efficiency of the light may be increased. Further, since by covering the side ends of the transparent substrate 2 other than the side end 3 are covered with the reflecting member, the light is prevented from emitting from the side ends, the volume of illuminating light emitted therefrom is large comparing with the other surfaces, it is preferable to cover them with the reflecting members.

Further, since the reflection angle of the light is changed according to the shape of the groove portions 8 of the light reflection pattern 7, the emitting direction of the light from the lower surface 5 of the transparent substrate 2, in order to make the light emitted mostly in the direction perpendicular to the lower surface 5 (i.e. in the front direction), the shape of the groove portion 8 can be suitably settled.

Now, as an illuminating means for a liquid crystal display apparatus (including a reflection type of a liquid crystal display element L), each of spread illuminating apparatus 41,1' uses, as a light source, a cold cathode fluorescent lamp (CCFL) or a hot cathode fluorescent lamp (HCFL), so that there are following problems.

That is, in response to the recent request for a need in which a device is made to become thinner the above fluorescent lamps to be used as a light source lamp 4, 42 has to have a tendency in which its diameter is formed to be outstandingly small, in accordance with which such a device is apt to be damaged by a small shock to need a special handling for that.

In addition, in order to make the fluorescent lamps to be used as the light source lamps 4, 42 emitted, in general, a high voltage more than several hundreds to 1000 V is needed, and for that purpose, the fluorescent lamps are provided with a complicated switching on circuit so-called an inverter. Accordingly, a space for accommodating such an inverter has to be secured, on the other hand, in the demand for requiring for making a device thinner and miniaturized, a demand that the space for an inverter is required to be as small as possible has been increased. Also, there is a problem that for protection against the high voltage a complicated countermeasure has to be taken.

Although it is possible to solve the above problem, in place of such fluorescent lamps (bar-like light source) as the light source lamp 4, 42, by using a spot-like light source for instance such as a light bulb or an emitting diode, if merely disposing such a spot-like light source at the position where the light source lamp 4, 42 of the conventional spread illuminating apparatus 41, 1', there can be a problem that only the area closer to the spot-like light source is illuminated and a spread and even emitting is not realized.

SUMMARY OF THE INVENTION

Accordingly, the present invention is to provide a spread illuminating apparatus, which is improved in an easy handling by preventing it from being broken due to an increase of a shock resistance and which can generate an evenly spread light emitting by using a light source lamp which can avoid a consideration for safety such as a switching apparatus like an inverter by switching on at low voltage.

According to a first aspect of the invention, in a side light system of the spread type of illuminating apparatus which comprises a bar-like light source disposed nearby a side of a transparent substrate, said light source consists of a bar-like light conductive member made of a transparent material and disposed close to at least one side end of the transparent substrate, a spot-like light source disposed on one of the bar-like light conductive member and a light reflection plate disposed on the other end of the light conductive member.

According to this aspect, by disposing the spot-like light source on one end of the light conductive member disposed close to the side end of the transparent substrate, the light emitted from the spot-like light source enters the light conductive member, is discharged from the opposing surface to the transparent substrate and such discharged light enters the transparent substrate. Further, the light reached the other end of the light conductive member is reflected by the reflection plate, again enters light conductive member and progresses therein toward the spot-light source. This reflected light too is emitted from the surface of the light conductive member opposing to the transparent substrate and enters the transparent substrate. Therefore, the light emitting efficiency can be increased.

According to a second aspect of the spread illuminating apparatus of the present invention, a manner of reflection of the reflection plate is determined in consideration of a reflection manner of an optical path conversion means provided on at least one of the surface of the light conductive member opposing to the transparent substrate or opposite to that surface.

The emitting light entered the light conductive member from the spot-like light source is reflected or refracted due to the optical path conversion means and emitted from the surface opposing to the one surface of the transparent substrate. Therefore, by considering the manner, for instance, a relation between the distance from the spot-like light and a light amount and determining the manner of reflection of the reflection means (plate), a brightness of all over the light conductive member can be appropriately controlled.

According to a third aspect of the spread illuminating apparatus a reflection plate disposed adjacent to the other end of the light conductive member is used. And by this reflection plate, the-emitted light reached the other end of the light conductive member is made to be reflected and progressed again toward the spot-like light source. This reflected light too is made to be emitted from the surface of the light conductive member and enters the transparent substrate. Therefore, the light emitting efficiency of the light conductive member can be increased.

Further, In a spread illuminating apparatus according to a fourth aspect of the present invention, the reflection means is formed from a metal vaporized layer on the other end of the light conductive member. And, by the metallic layer, the emitting light reached the other end of the light conductive member is reflected, again it is made to progress in the light conductive member toward the spot-like light source . This reflected light too is emitted from surface opposing to the transparent substrate and enters the transparent substrate. Therefore, the light emitting efficiency of the light conductive member can be increased.

Further, in a spread illuminating apparatus according to a fifth aspect of the present invention, said light reflection means is a coating layer applied on the other end of the light conductive member. And, by the coating layer the emitted light reached the other end of the light conductive member is made reflected, and again progresses toward the spot-like light source. This reflected light too is emitted from the surface of the light conductive member opposing to the transparent substrate. Therefore, the light emitting efficiency of the light conductive member can be increased.

EMBODIMENT

Figure 15:
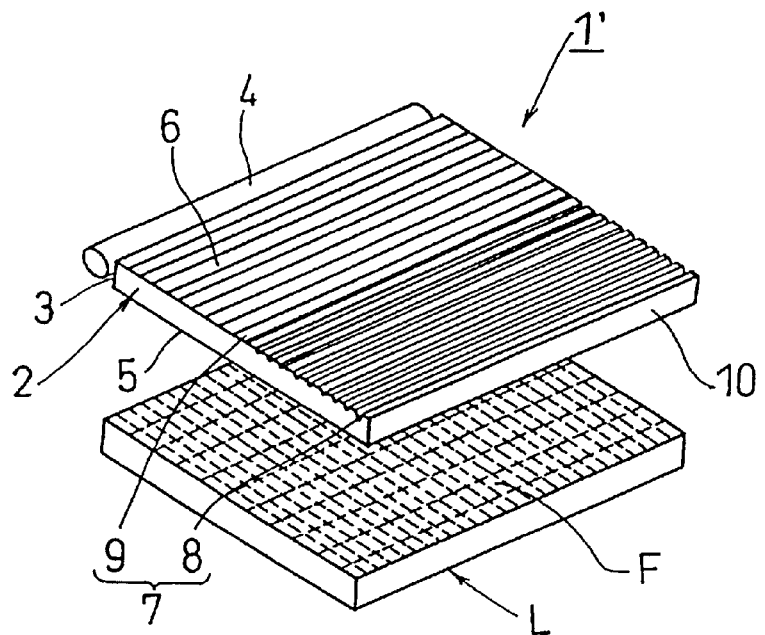
FIG. 15 is a broken perspective view for explaining the structure of the conventional spread illuminating apparatus different from FIG. 13.
Figure 16:
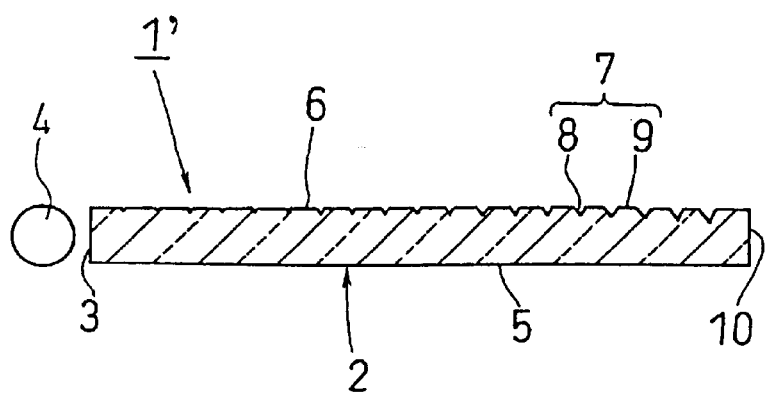
FIG. 16 is a generally sectional view of the spread illuminating apparatus shown in FIG. 15.

Hereinafter, a constitution of an embodiment of a spread illuminating apparatus 1 of the present invention is explained based on the attached drawings. Now, since this spread illuminating apparatus 1, as well as the spread illuminating apparatus 1' explained based on FIGS. 15 and 16 in the column for explaining a conventional art, is used for the similar purpose as the spread illuminating apparatus which is disposed in such a manner as it covers an observing surface F of a reflection type of the liquid crystal display element L, the members similar to the conventional spread illuminating apparatus 1' are attached with the same signs and the explanations are omitted.

Figure 1:
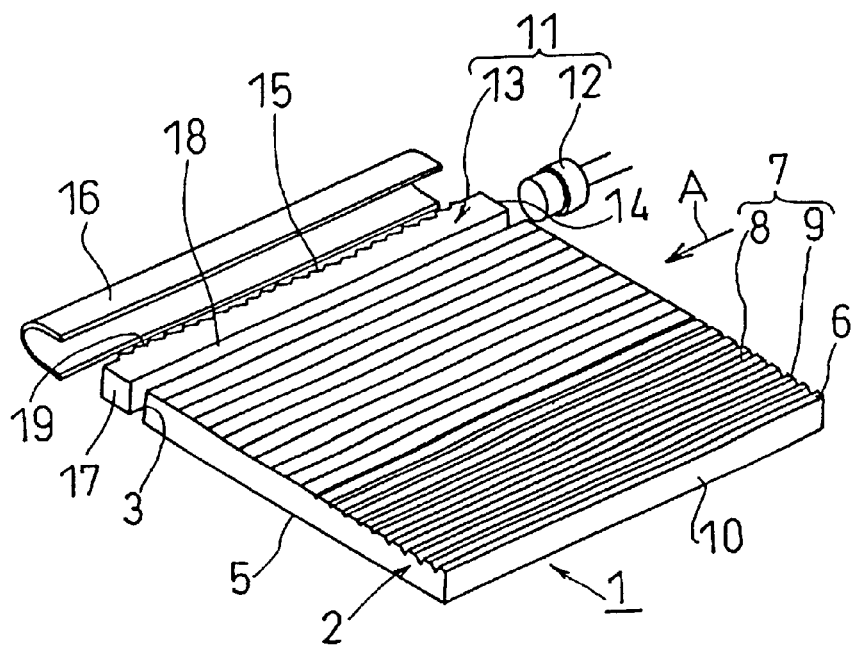
FIG. 1 is a broken perspective view of an embodiment of the spread illuminating apparatus.
Figure 2:
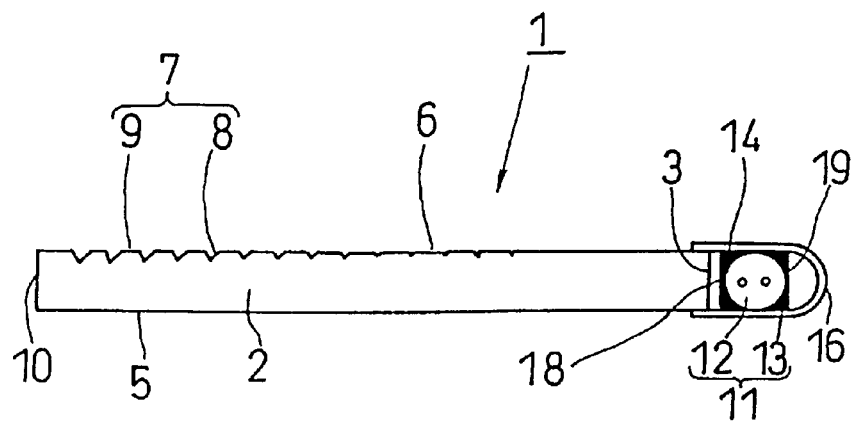
FIG. 2 shows a constitution of the spread illuminating apparatus viewing from an arrow A in FIG. 1.

As shown in FIGS. 1 and 2, the constitution of the spread illuminating apparatus 1 is approximately similar to the conventional one, a transparent substrate 2 and a light source 11 (details thereof are explained later) are primary constitutions, in which a lower surface 5 of the transparent substrate 2 is disposed on the observing surface F side (see FIG. 15) of the reflection type of liquid crystal display element L, and the difference from the conventional apparatus 1' resides in that, in place of the conventional bar-like light source i.e. a light source lamp 4, as a light source 11 a spot-like light source 12 and a bar-like light conductive member 13 (in FIG. 2, indicated in black for easy looking) are provided.

As the spot-like light source 12, in this embodiment, a light emitting diode is used, further the light conductive member 13 consisting of a transparent material is adapted to be disposed along one side 3 of the transparent substrate 2 at a given spacing and close to one end 14 of the light conductive member 13 the spot-like light source 12 is disposed. In addition, on the light conductive member 13, an optical path conversion means 15 (explained in detail later) is provided. And, surfaces of the light conductive member 13 except the surface opposing to the transparent substrate 2 along the longitudinal direction are covered with a light reflection member (a reflector) 16 in order to introduce a light effectively into the transparent substrate 2.

From a reason of design, even in the case where the light reflection member 16 can not cover the surfaces of the light conductive member 13, by covering at least the portion where the optical path conversion means 15 is formed, the effect is outstandingly increased. As the light reflection member a film deposited with silver by vaporization, a white film or a sheet-like film such as a film coated in white or a metal plate worked in bending such as an aluminum plate finished by mirror polishing is used. Further, by providing a light reflection means (to be explained later) on the other end 17 of the light conductive member 13 where the spot-like light source 12 is not disposed, a light is introduced more effectively in the transparent substrate 2.

Hereinafter, based on FIG. 3 the optical path conversion means 15 formed on the light conductive member 13 is explained. The optical path conversion means 15 comprises a light diffusion portion 20 (black portion in FIG. 3) which is formed with a minute concavo-convex portion applied by coarsening a surface 19 opposite to a surface 18 (see FIGS. 1 and 2) opposing to the one end side 3 of the transparent substrate 2 and a plane portion 21 not worked by coarsening. Since the light diffusion portion 20 is formed with the minute concavo-convex portion, of the light to be emitted from the spot-like light 12, to enter the light conductive member 13 from an end portion 14 and to be reflected on the opposite surface 19, the light volume to be reflected on the light diffusion portion 20 and eventually enter the transparent substrate 2 through the surface 18 is increased compared with the light originated from the plane portion 21.

Figure 3:
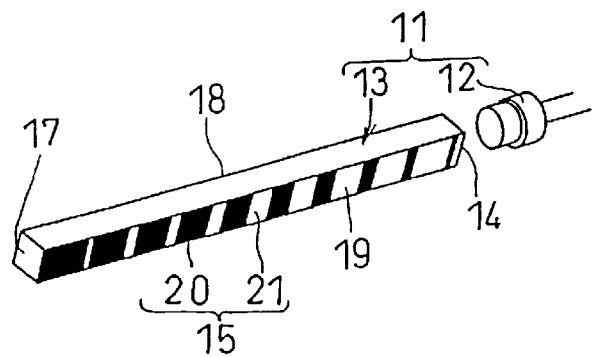
FIG. 3 is a broken perspective view showing the structure of the light source as a gist of the present invention.

For that purpose, as shown in FIG. 3, the light diffusion portion 20 is formed in such a manner as the area thereof becomes large as it is located far from the spot-like light source 12. Thereby, by forming the light diffusion portion 20 in the light of balancing the distance from the spot-like light source 12 and the area of the light diffusion portion 20 in such a manner as the light amount of the light passing through the surface 18 becomes large as the light diffusion portion 20 is separated farther from the spot-like light source 12, although the spot-like light source 12 is disposed at the end 14 of the light conductive member 13, the light becomes even at the position of the surface 18. Accordingly, a light source 11 consisting of the spot-like light source 12 and the light conductive member 13 function as well as a conventional bar-like light source. Further, since the spread and even emitting of the spread illuminating apparatus 1 is similar with the one of what is explained in the conventional spread illuminating apparatus 1', its explanation is omitted.

As a method of coarsening for forming the light diffusion portion 20 which constitutes the optical path conversion means 15 of the light conductive member 13, although it is possible to work directly the opposite surface 19 of the light conductive member 13, it may be also possible, when the light conductive member 13 is formed with a transparent resin material, to transfer the minute concavo-convex surface as the light diffusion portion 20 prepared on the dies by a sand blasting or etching to the light conductive member 13 when molding the light conductive member 13 simultaneously.

Further, as the light conductive member 13 as shown in FIG. 3, it is not limited to what is square in section, it may, for instance, what is circular in section can be used as a light conductive member 13.

In addition, in place of forming the light diffusion portion 20 with a minute concavo-convex portion, it may be formed by coating white thereon (opal is also possible). Thus, by coating white too, since the light reflection ratio becomes higher compared with the plane portion, the light volume which comes through the surface 18 and enters the transparent substrate 2 becomes larger.

Therefore, as well as the light diffusion portion 20 formed with the above concavo-convex portion, the light diffusion portion 20 formed with coating is formed in such a manner as the area thereof becomes large as it is separated from the spot-like light source 12, and the even emitting at the surface 18 is adapted to be realized. Now, the application method of coating on the light conductive member 13 can be a general printing such as a screen printing or a general coating such as a spray coating.

Figure 5:
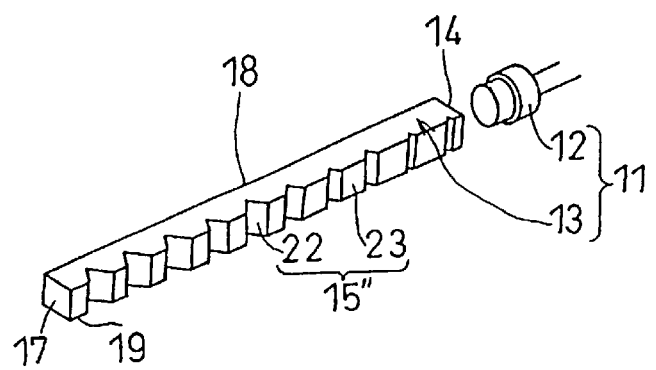
FIG. 5 is a broken perspective view showing a light source as still other gist different from FIG. 4 of the present invention.
Figure 6:
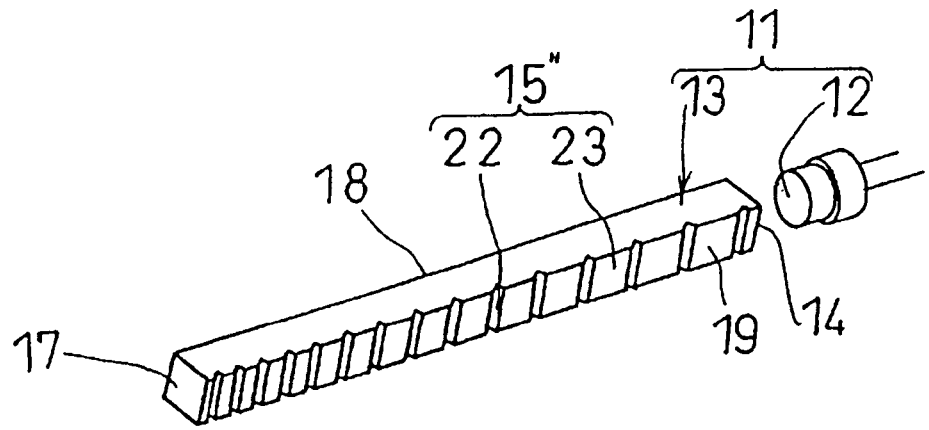
FIG. 6 is a broken perspective view showing a light source as still other gist different from FIG. 5 of the present invention.

Further, in the light source 11 shown in FIGS. 5 and 6, the optical path conversion means 15" of the light conductive member 13 is formed with a groove portion 22 approximately triangular in section and a plane portion 23 formed between the groove portions 22. The light which progresses in the light conducive member 13 and is reflected on the opposite surface 19, when reflected on the groove portion 22, by the inclined surface of the groove portion 22 the light is apt to progress approximately normal to the surface 18 and compared with the case where being reflected on the plane portion 21, the volume of the light which comes through the surface 18 and enters the transparent substrate 2 becomes larger. Accordingly, the ratio of the width (occupied area) of the groove portion 22 to the width (occupied area) of the plane portion 23 is settled in such a manner as it becomes gradually large as the groove portion 22 is separated from the end of the light conductive member 13. At that time, as it is formed in consideration of the balance between the distance from the spot-like light source 12 and the occupied area of the groove portions 22, although the spot-like light source 12 is disposed at the end 14, the light is emitted even from the surface 18.

As stated above, in order to change concretely the ratio of the occupied area of the groove portion 22 and the plane portion 23, in the case of the optical path conversion means 15" shown in FIG. 5, a spacing (pitch) between one groove portion 22 and an adjacent groove portion 22 is made to be constant and the cut out depth is made to be settled to become gradually larger as it is departed farther from the spot-like light source 12. On the other hand, in the case of the optical path conversion means 15" shown in FIG. 6, the cut out depth of the groove 22 is made to be constant, but the spacing (pitch) between the groove portions 22 is formed to be gradually narrower.

Figure 7:
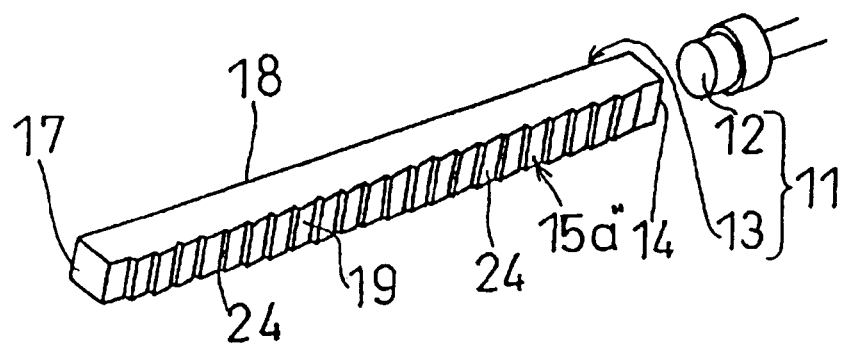
FIG. 7 is a broken perspective view showing a light source as still other gist different from FIG. 6 of the present invention.

The groove portion 22 to form the optical path conversion means 15" is approximately triangular in section, but it is not necessarily limited thereto, it may be formed to be approximately square in section or in other polygons, and further, it may be formed by the curve similar to the inclination of the surface to constitute a groove face. Further, as the optical path conversion means 15" a as shown in FIG. 7, the plane portion is not provided, but it may be formed by arranging continuous mountain portions 24 each of which is formed by two inclined surfaces continuously, which form an approximately triangular in section. In this case too, in order to realize an even emitting at the surface 18, it has to be formed in consideration of its inclination angle, size and spacing.

Next, comparing with the spread illuminating apparatus 1 shown in FIG. 1, another example to intend to increase the brightness of the picture is explained.

Figure 8:
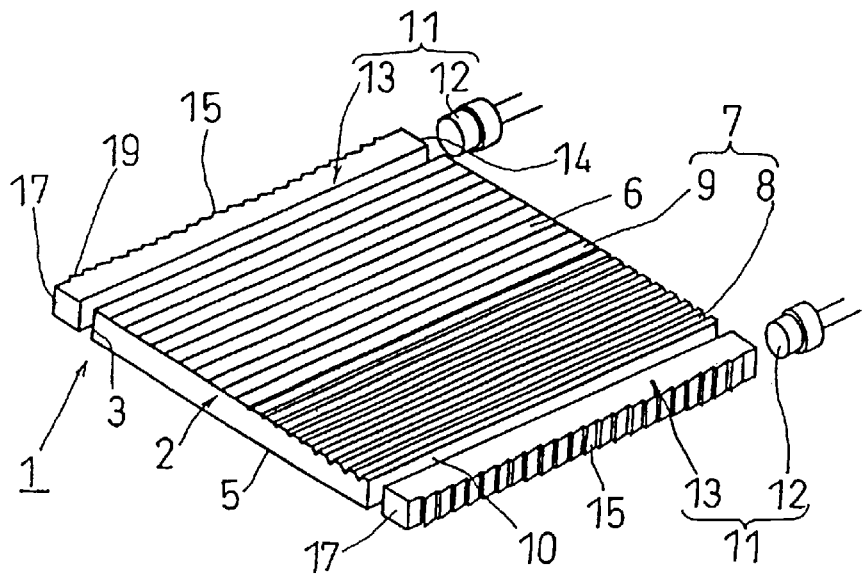
FIG. 8 is a broken perspective view showing a spread illuminating apparatus different from FIG. 1 of the present invention.

The spread illuminating apparatus 1 shown in FIG. 8 is what uses a plurality of light sources 11 which are constituted with the spot-like light source 12 and the light conductive member 13, that is, on one side end 3 a light source 11 is disposed and further on the opposite side 10 too, another light source 11 is disposed. In this case, in order to realize an even emitting of the whole screen of the spread illuminating apparatus 1, it is a matter of course to form by considering the pattern design of the light diffusion pattern 7. Now, the positions to locate the light source 11 are not limited to one side end 3 of the transparent substrate 2 and the opposite surface 10, but the light sources are possible to be located at any side of the transparent substrate 2, further the number to use the light source is not limited to 2, but more number of the light source 11 may be disposed.

Figure 9:
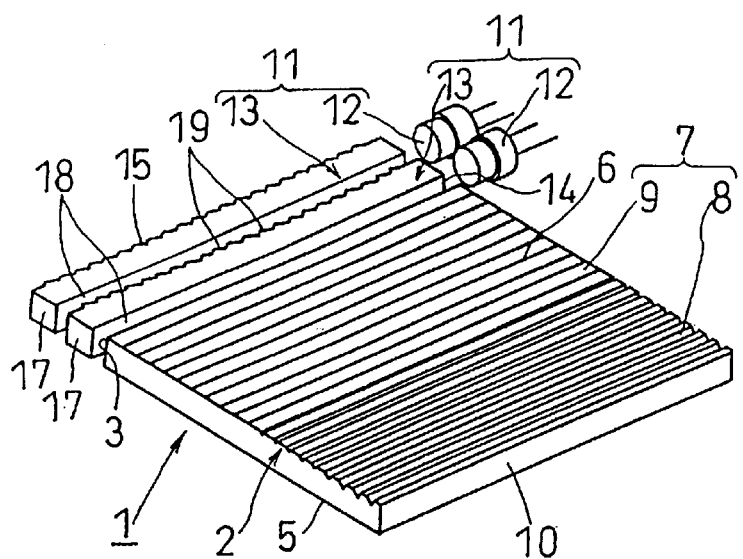
FIG. 9 is a broken perspective view showing a spread illuminating apparatus different from FIG. 1 of the present invention.

The spread illuminating apparatus 1 shown in FIG. 9 is what two light sources 11 are disposed along the one end side 3 of the transparent substrate 2. The light conductive member 13, since it is made of a transparent material, is not prevented from entering of the light emitted from the outer located light source 11.

The embodiments shown in FIGS. 8 and 9 are what are planned to increase the brightness of the picture by increasing the number of the spot-like light source, however under the following method, without increasing the number of the light source, a similar effect can be obtained.

Figure 10A:
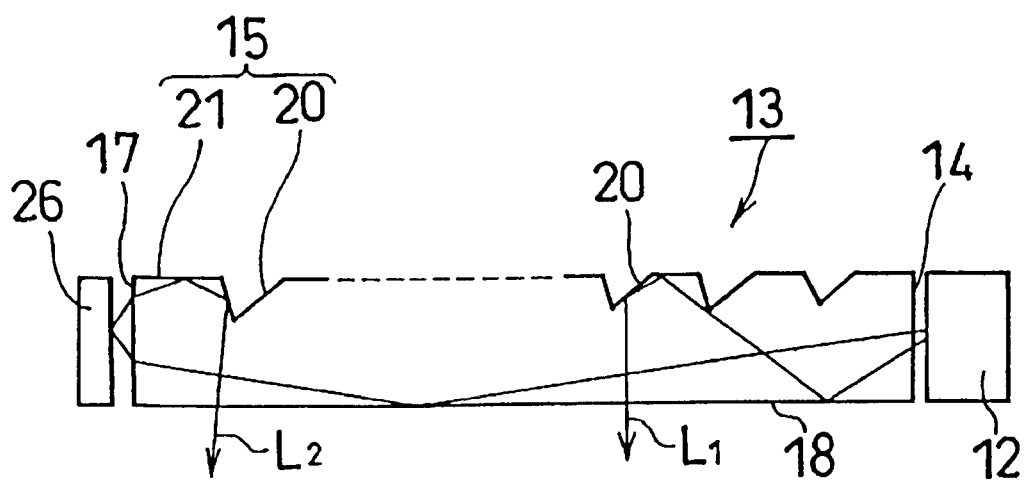
FIG. 10A is a schematic diagram showing that the optical path of the light entering and progressing in the light conductive member, when the light reflection means is provided at the other end of the light conductive member where the spot-like light source is not disposed.
Figure 10B:
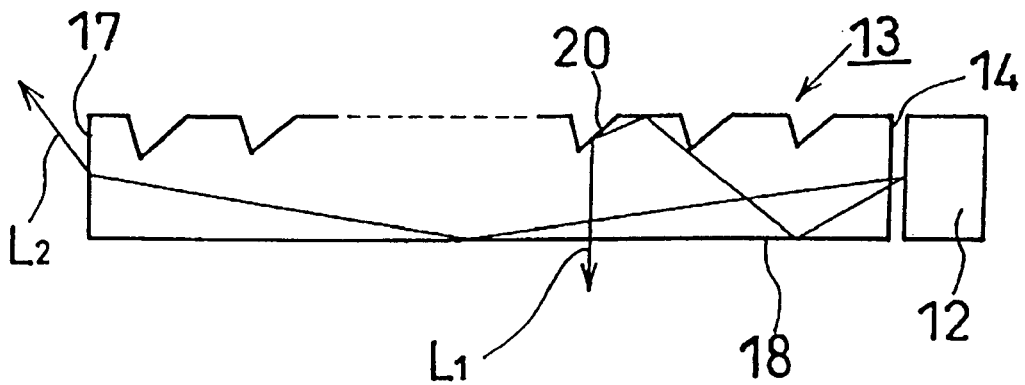
FIG. 10B is a schematic diagram showing optical path of the light entering and progressing in the light conductive member, when the light reflection means is not provided at the other end.

In FIG. 10A, in order to introduce more effectively the light in the transparent substrate 2, an example which is provided with a light reflection means 26 at the other end 17 of the light conductive member 13 where no spot-like light source 12 is disposed. According to this structure, from one end 14 of the light conductive member 13, an emitted light $L_1$ of the spot-like light source 12 enters the light conductive member 13. This light $L_1$ entered the light conductive member 13 is reflected on the groove portion 20 of the optical path conversion means 15 and discharged from the surface 18 opposing to the transparent substrate 2, and such light $L_1$ enters the transparent substrate 2 (FIG. 1). Further, one portion $L_2$ of the light emitted from the spot-like light source 12 reaches the other end 17 of the light conductive member 13. This light $L_2$ as shown in FIG. 10(B), in the case where at the other end 17 of the light conductive member 13 the light reflection means 26 is not provided, leaks out from the other end 17 and is never discharged from the surface 18.

However, as shown in FIG. 10(A), in the case where the light reflection means 26 is provided at the other end 17 of the light conductive member 13, the emitted light $L_2$ is reflected by the light reflection means 26 again progresses in the light conductive member 13 toward the spot-like light source 12. And, the reflected light $L_2$ also is reflected on the groove portion 20 of the light reflection pattern 7 and is discharged from the surface 18 of the light conductive member 13 opposing to the transparent substrate 2, and such discharged light $L_2$ enters the transparent substrate 2. Accordingly, the light emitting efficiency of the light conductive member 13 can be increased.

Now, as the light reflection means 26, what are disposed with a white reflection plate (a foam type of white diffusion), reflection plates such as a metal vaporized film, what is formed with a metal layer by being vaporized with a metal (such as silver and aluminum) directly on the surface of the other end 17 of the light conductive member 13, and what is formed with coating layer by applying a white coat are used.

Now, when setting the light reflection means 26 on the other end 17 of the light conductive member 13, it is preferable to determine the characteristic thereof in consideration of the property of the optical path conversion means 15 of the light conductive member 13.

Figure 11A:
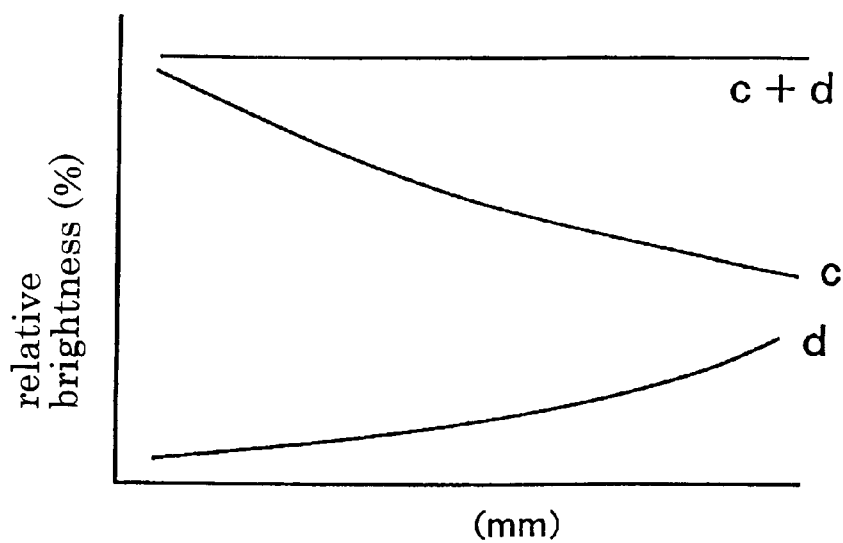
FIG. 11(A) is a graph showing a relation between an incident ray of light according to the distance from the spot-like light source and a returning ray of light according to the distance from the spot-like light source.
Figure 11B:
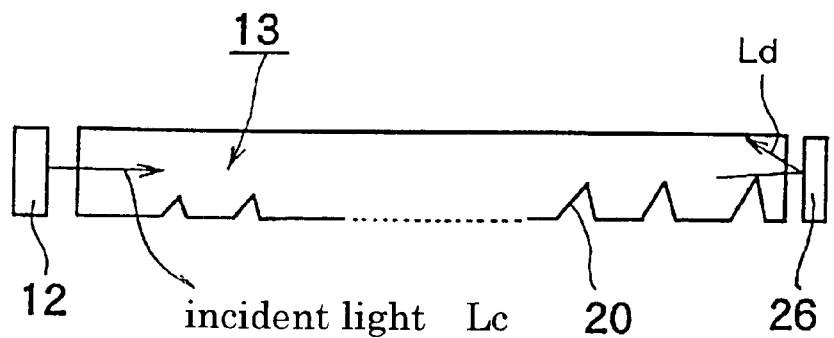
FIG. 11(B) is a schematic diagram showing a relation between light incident upon the light conductive member from the spot-like light source and a returning ray of light incident upon the light conductive member reflected by the light reflection member.

The characteristic of the optical path conversion means 15 of the light conductive member 13, for instance, means the relation between the distance from the spot-like light source and the light volume. In general, as shown in a curve c in FIG. 11(A), in consideration of returning of the reflected light volume, in accordance with the distance from the spot-like light source, the light volume emitted is made to be reduced. FIG. 11(B) is a schematic diagram showing the light Lc which enters the light conductive member 13 from the spot-like light source 12 and the returning light Ld reflected by the light reflection means 26 and entering the light conductive means 13. As mentioned above, by making the reflected light volume (sign d) obtained by the light reflection means 26 supplemented the reduction of the emitting light volume due to the optical path conversion means 15, the overall brightness of the light conductive member is approximately controlled to increase the efficiency of emitting light and realize an even emitting.

As mentioned above, by combining arbitrarily the examples of the spread illuminating apparatuses 1 so as to increase the brightness based on FIGS. 8 to 10, the further increasing of the brightness can be obtained.

Figure 12:
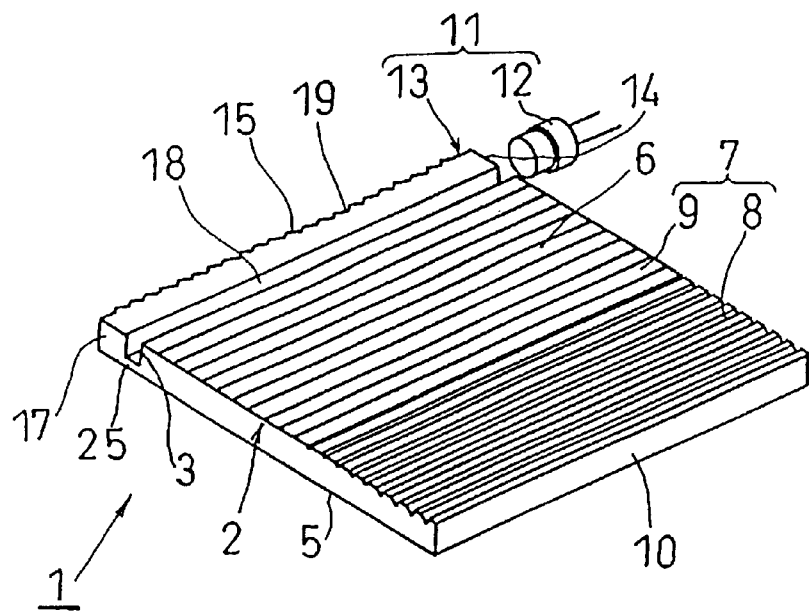
FIG. 12 is a broken perspective view showing the structure of a spread illuminating apparatus different from FIG. 1 of the present invention.

In the spread illuminating apparatus 1 shown in FIG. 12, a connecting portion 25 extending from the lower surface 5 of the transparent substrate 2 to the lower surface of the light conductive member 13 of the light source 11 is formed to unify the transparent substrate 2 and the light conductive member 13. Thus, due to the structure providing the connecting portion 25, the transparent substrate 2 and the light conductive member 13 can be molded simultaneously to reduce the number of parts and assembling processes. In this case also, by providing the light reflection means 26 on the other end 7 of the light conductive member 13, it is possible to increase the brightness of the picture. Now, the connecting portion 25 is preferably from the mechanical strength as small as possible.

And, in the present embodiment, the light emitting diode is used as the spot-like light source 12, is used, however it is not limited thereto, for instance, such as an incandescent lamp is possible, if it can be turned on at a comparatively low voltage as the light source 12.

Figure 4:
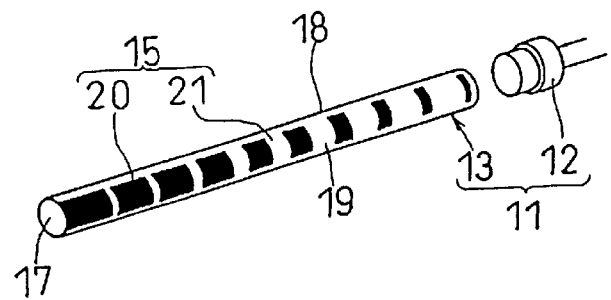
FIG. 4 is a broken perspective view showing a light source as another gist different from FIG. 3 of the present invention.

The light conductive member 13 which is explained in various embodiments is not limited to a square (FIG. 3) or circular (FIG. 4) shape in section, but it is possible to be applied even if it is other polygon other than square or oval. Further, the light conductive member 13 may be possible even if the sectional figure changes along its length (for instance from circular to square in section).

The material of the light conductive member 13 may be the material to make the light passed effectively and from the view point of the transparency and the workability, acrylic resin is most suitable. However, when practicing the present invention, the material is not limited to this, and in place of that, every kind of thermoplastic resin such as vinyl chloride resin, polycarbonate resin, olefins resin, styrene resin can be used. Further, according to circumstances, thermosetting transparent resin such as epoxy resin, allyldiglycollcarbonate resin and inorganic transparent material such as every kind of glass material can be used.

As the preparing method of the light conductive member 13, by a direct mechanical working such as cutting, cut-working, or by casting, and by every kind of molding method such as thermal press-molding, pressure-molding and injection molding can be applied, but from the production view point, the injection molding is most preferable.

The optical path conversion means 15 formed in the light conductive member 13, in the present embodiment, it is exemplified in forming merely on the opposite surface 19, but in addition to the surface 19, it may be formed widely on the other surfaces, to enable to form widely the light conversion means.

Figure 13:
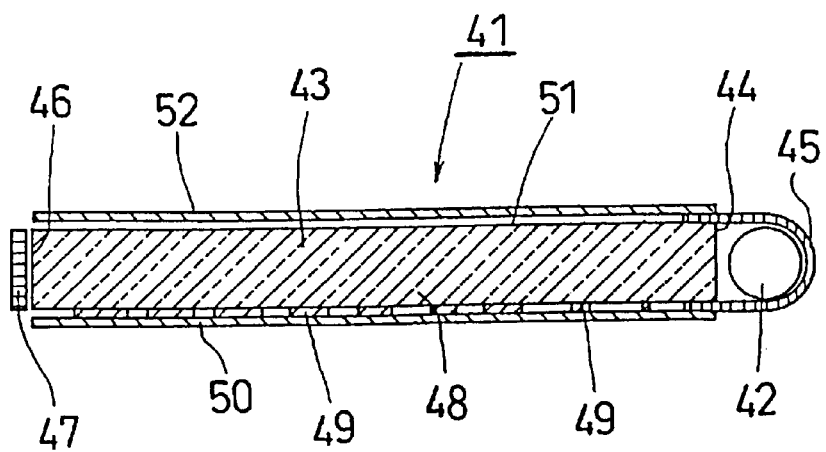
FIG. 13 is a sectional view showing the structure of a conventional spread illuminating apparatus.
Figure 14:
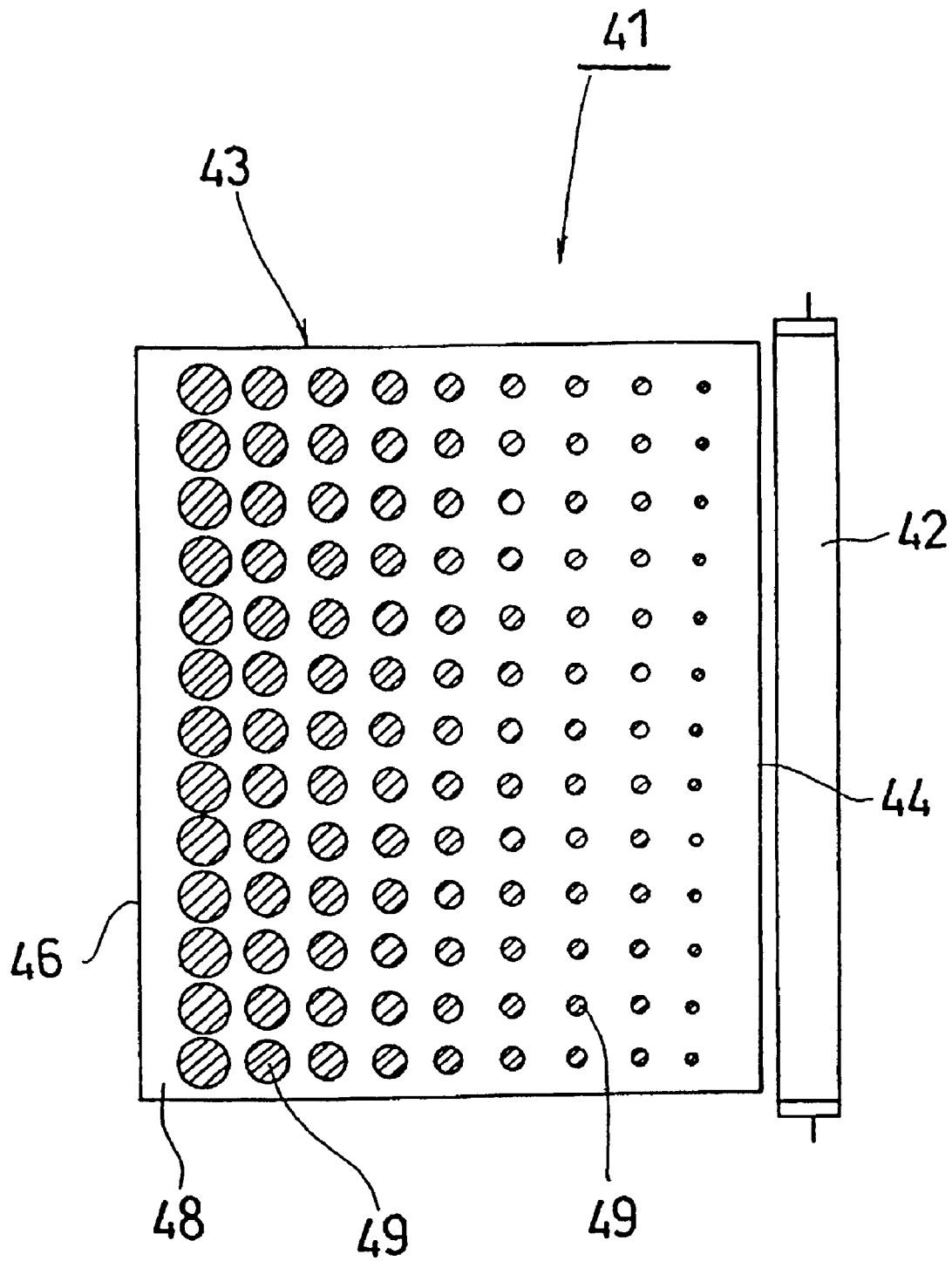
FIG. 14 is a schematic diagram for explaining a conventional light diffusion pattern of the spread illuminating apparatus shown in FIG. 13.

In the embodiment, the explanation is made about the spread illuminating apparatus (FIGS. 15 and 16), primarily as a supplemental illuminating apparatus for a reflection type of a liquid crystal apparatus, which is disposed in front of a reflection type of a liquid crystal element, it is not limited to that type, for instance, the light source lamp 42 of the spread illuminating apparatus 41 as a rear illuminating means for a see-through type of liquid crystal element shown in the conventional art in FIGS. 13 and 14 can be used in place of the light source 11 of the present invention. Further, it is applicable to all conventional light source which consists of a fluorescent lamp.

Hereinafter, in the spread illuminating apparatus 1 shown in FIG. 1, an energy efficiency is compared from the concrete dimensions of the transparent substrate 2, the light conductive member 13, by comparing the cases where the light reflection means 26 is provided and not provided on the other end 17 of the light conductive member 13.

Comparative Test

Transparent Sustrate 2:
  width=80 mm
  depth=60 mm
  thickness=0.8 mm
Light Conductive Member 13:
  length=80 mm
  width=3 mm
  thickness=1 mm Further, as a light reflection means 26, a light reflection plate made of a silver vaporized film is disposed adjacent to the other end 17 of the light conductive member 13.

Under the above conditions a comparative test was carried out, on one hand, an energy efficiency without the light reflection means 26 was 90%, on the other hand with the light reflection means 26 the energy efficiency was improved to raise up to 98%.

As the present invention was constituted as such, the following effects were obtained.

First, according to the first aspect of the spread illuminating apparatus of the present invention, since the light conductive member made of a bar-like transparent material disposed along at least one side end of the transparent substrate and the spot-like light source disposed to at least one end of the light conductive member are used, the emitted light from the spot-like light source enters the light conductive member and the surface of the light conductive member opposing to the transparent substrate becomes a bar-like light source as a whole so as to make the light emitted therefrom entered the transparent substrate. Accordingly, since, without using the conventional fluorescent lamp which has been used as the light source, as the illuminating means the light source of the present invention is used for illuminating the spread illuminating apparatus, it becomes possible to turn on the light source at a low voltage, there is no need of turning on device such as an inverter and considering a safety. Further, due to the use of the light conductive member made of transparent material, comparing the case where the similar size of fluorescent lamp is used, the anti-shock property becomes outstandingly increased to prevent it from being damaged and a handling property becomes improved.

In addition, by providing the light reflection means, a deteriorating of the emitting efficiency due to being discharged after entering the light conducting member, and reaching the other end of the light conducting member is prevented from being generated to increase the light emitting efficiency from the light conductive member.

Further, according to the second aspect of the present invention, the overall brightness of the light conductive member is approximately controlled and while increasing the brightness of the transparent substrate the brightness as a whole is intended to become even.

In addition, according to the third, fourth and fifth aspects of the present invention, the emitting efficiency of the light conductive member is adapted to be increased, and it becomes possible to provide the spread illuminating apparatus which can realize the spread and even light emitting.

What is claimed is:

1. In a side system of a spread illuminating apparatus in which a bar-like light source is disposed close to a transparent substrate made of a transparent material having transparency, said light source consists of a light conductive member made of a bar-like transparent material having transparency and disposed along and close to at least one side end of the transparent substrate, said transparent substrate and said light conductive member are integrally formed in such a manner that both parts are continuous with each other at one of upper and lower surface sides, a spot-like light source is disposed at one end of the light conductive member and a light reflection means is formed by vaporizing a metallic layer on the other end of the light conductive member, and an amount of light reflected at said light reflection means is adapted to make up for an amount of reduction of emitted light at an optical path conversion means.

2. In a side system of a spread illuminating apparatus in which a bar-like light source is disposed close to a transparent substrate made of a transparent material having transparency, said light source consists of a light conductive member made of a bar-like transparent material having transparency and disposed along and close to at least one side end of the transparent substrate, said transparent substrate and said light conductive member are integrally formed in such a manner that both parts are continuous with each other at one of the upper and lower surface sides, a spot-like light source is disposed at one end of the light conductive member and a light reflection means is formed by applying a coating layer on the other end of the light conductive member, and an amount of light reflected at said light reflection means is adapted to make up for an amount of reduction of emitted light at an optical path conversion means.

* * * * *